(12) United States Patent
Bohli et al.

(10) Patent No.: US 9,866,387 B2
(45) Date of Patent: Jan. 9, 2018

(54) METHOD AND SYSTEM FOR ACCESSING DEVICE BY A USER

(71) Applicant: NEC EUROPE LTD., Heidelberg (DE)

(72) Inventors: Jens-Matthias Bohli, Leimen (DE); Wenting Li, Heidelberg (DE); Jan Seedorf, Heidelberg (DE)

(73) Assignee: NEC Corporation, Tokyo (JP)

( * ) Notice: Subject to any disclaimer, the term of this patent is extended or adjusted under 35 U.S.C. 154(b) by 237 days.

(21) Appl. No.: 14/782,611

(22) PCT Filed: Apr. 12, 2013

(86) PCT No.: PCT/EP2013/057694
§ 371 (c)(1),
(2) Date: Oct. 6, 2015

(87) PCT Pub. No.: WO2014/166546
PCT Pub. Date: Oct. 16, 2014

(65) Prior Publication Data
US 2016/0050070 A1 Feb. 18, 2016

(51) Int. Cl.
*H04L 9/32* (2006.01)
*H04L 9/08* (2006.01)
*H04L 29/06* (2006.01)

(52) U.S. Cl.
CPC ............ *H04L 9/3213* (2013.01); *H04L 9/083* (2013.01); *H04L 9/0819* (2013.01); *H04L 9/0861* (2013.01); *H04L 63/0281* (2013.01); *H04L 63/0807* (2013.01); *H04L 2209/46* (2013.01); *H04L 2209/50* (2013.01)

(58) Field of Classification Search
None
See application file for complete search history.

(56) References Cited

U.S. PATENT DOCUMENTS

| | | | | |
|---|---|---|---|---|
| 6,175,920 B1 * | 1/2001 | Schanze | ............. | H04L 63/0807 713/150 |
| 7,392,390 B2 * | 6/2008 | Newcombe | ............. | H04L 29/06 713/168 |

(Continued)

OTHER PUBLICATIONS

Carlo Blundo et al: "Analysis and Design of Distributed Key Distribution Centers", Journal of Cryptology, Springer-Verlag, NE, vol. 18, No. 4, Sep. 1, 2005 (Sep. 1, 2005), pp. 391-414, XP019362639.

*Primary Examiner* — Maung Lwin
*Assistant Examiner* — Olanrewaju Bucknor
(74) *Attorney, Agent, or Firm* — Leydig, Voit & Mayer, Ltd.

(57) ABSTRACT

A method for accessing a device by a user connected to the device and to at least two servers in different networks includes collaboratively generating parts of an authentication ticket on the at least two servers, collaboratively generating parts of a user session key and encrypting a combined user session key, authenticating with the authentication ticket at a distributed ticket granting server by collaboratively decrypting user request information using the combined user session key and comparing its content with the authentication ticket, collaboratively generating an encrypted user-to-device ticket and an encrypted user-to-device session key, and accessing the device by the user using the encrypted user-to-device ticket and the user-to-device session key.

15 Claims, 3 Drawing Sheets

(56) References Cited

U.S. PATENT DOCUMENTS

| | | | |
|---|---|---|---|
| 7,395,549 B1* | 7/2008 | Perlman | H04L 9/0825 380/279 |
| 7,421,083 B2* | 9/2008 | Medvinsky | H04L 9/0822 380/273 |
| 8,971,537 B2* | 3/2015 | Naedele | H04L 63/08 380/282 |
| 2003/0046541 A1* | 3/2003 | Gerdes | G06F 21/31 713/168 |
| 2003/0188193 A1* | 10/2003 | Venkaramappa | H04L 63/0815 726/10 |
| 2004/0128499 A1* | 7/2004 | Peterka | H04L 63/062 713/155 |
| 2005/0005114 A1* | 1/2005 | Medvinsky | G06F 21/10 713/168 |
| 2007/0006291 A1* | 1/2007 | Barari | G06F 21/335 726/10 |
| 2007/0127723 A1* | 6/2007 | Grobman | G06Q 20/382 380/278 |
| 2007/0180497 A1* | 8/2007 | Popescu | H04L 63/0435 726/4 |
| 2008/0022383 A1* | 1/2008 | Bobde | H04L 29/06027 726/10 |
| 2008/0072303 A1* | 3/2008 | Syed | H04L 63/0807 726/10 |
| 2008/0175393 A1* | 7/2008 | Oba | H04L 63/062 380/279 |
| 2008/0178276 A1* | 7/2008 | Christiansen | H04L 9/3213 726/10 |
| 2008/0183623 A1* | 7/2008 | Xu | H04L 63/0807 705/51 |
| 2008/0212783 A1* | 9/2008 | Oba | H04L 9/083 380/279 |
| 2009/0183003 A1* | 7/2009 | Haverinen | H04L 9/0869 713/168 |
| 2016/0197906 A1* | 7/2016 | Kikuchi | H04L 9/085 713/168 |

* cited by examiner

METHOD AND SYSTEM FOR ACCESSING DEVICE BY A USER

CROSS REFERENCE TO RELATED APPLICATIONS

This application is a U.S. National Phase application under 35 U.S.C. §371 of International Application No. PCT/EP2013/057694, filed on Apr. 12, 2013. The International Application was published in English on Oct. 16, 2014 as WO 2014/166546A1 under PCT Article 21(2).

FIELD

The present invention relates to a method for accessing a device by a user, wherein the user is connected to the device and to at least two servers in different networks. The present invention also relates also to a system for accessing a device by a user, wherein the user is connectable to the device and to at least two authentication servers and two ticket granting servers on at least two networks, wherein each network comprises at least one authentication server and at least one ticket granting server.

BACKGROUND

Kerberos is a widely used standard protocol according to RFC4120. Kerberos uses a central Kerberos server that authenticates users and grants access to devices by issuing tickets to the users. Since Kerberos uses a central server, Kerberos is well suited for enterprise scenarios where all resources are owned and controlled by the enterprise and central Kerberos server is trusted since the server is operated by the enterprise itself usually in its own premises. However, the upcoming use of cloud services has the disadvantage that an implementation of a Kerberos server in the cloud can not be fully trusted. In this case the authentication services are being run on the premises of a potentially untrusted third party, i.e. the cloud service provider. Therefore the secret credentials needed for authentication cannot be stored in the cloud without violating privacy and further it cannot be ensured that the servers do not reduce their functionality to grant access to anyone.

Conventional methods for authentication in the cloud like in the non-patent literature of Bertino, Elisa, et al. "Privacy-preserving digital identity management for cloud computing", *Data Engineering* 32.1 (2009) use distributed servers and are based on the assumption that at most one of the servers is compromised.

Further in the non-patent literature of Moni Naor, et al. "Distributed Pseudo-Random Functions and KDCs", EUROCRYPT 1999 and Yanjiang et al. "A Practical Password-Based Two-Server Authentication and Key Exchange System", IEEE Transactions on Dependable and Secure Computing, April 2006 non-practical, complicated generic protocols are provided implementing proprietary and simple functions or protocols which have only theoretical value.

In the non-patent literature of Yan Huang, David Evans, Jonathan Katz, Lior Malka: Faster Secure Two-Party Computation Using Garbled Circuits, USENIX Security Symposium 2011 a fast multi-party AES encryption circuit is proposed yet not practical.

SUMMARY

In an embodiment, the present invention provides a method for accessing a device by a user, wherein the user is connected to the device and to at least two servers in different networks. The method includes collaboratively generating parts of an authentication ticket on the at least two servers, collaboratively generating parts of a user session key and encrypting a combined user session key, authenticating with the authentication ticket at a distributed ticket granting server by collaboratively decrypting user request information using the combined user session key and comparing its content with the authentication ticket, collaboratively generating an encrypted user-to-device ticket and an encrypted user-to-device session key, and accessing the device by the user using the encrypted user-to-device ticket and the user-to-device session key.

BRIEF DESCRIPTION OF THE DRAWINGS

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

DETAILED DESCRIPTION

Figure 1:
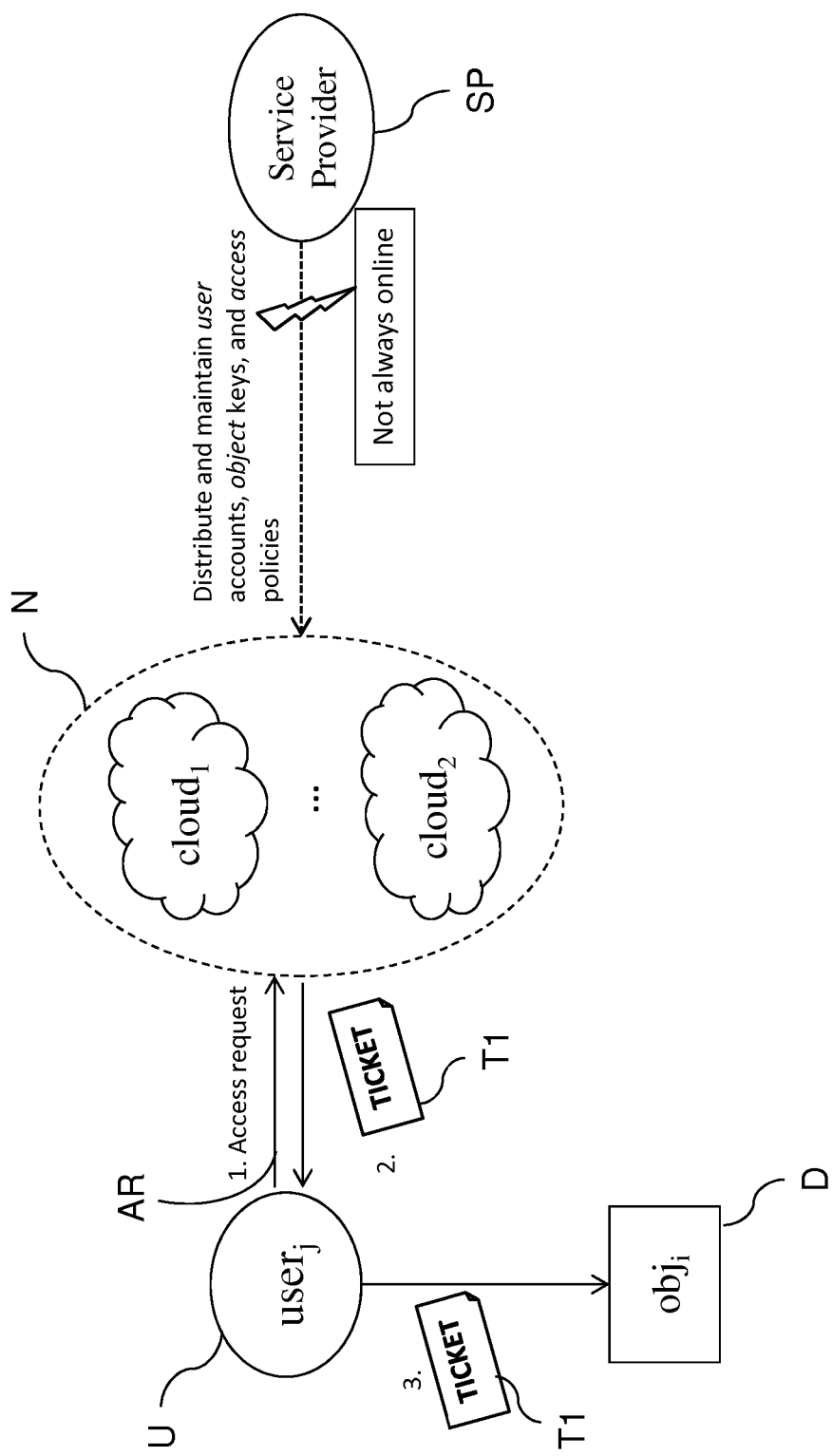
FIG. 1 shows a system according to a first embodiment of the present invention.

Although applicable to authentication/authorization protocols in general, the present invention will be described with regard to the Kerberos authentication protocol.

In an embodiment, the present invention provides a method and a system enabling secure accessing of a device by a user with cloud-based secure authentication and authorization services.

In an embodiment, the present invention provides a method and a system which are easy to implement.

In an embodiment, the present invention provides a method and a system with reduced costs of running servers.

In an embodiment, a method is provided that includes steps of (a) collaboratively generating parts of an authentication ticket on the servers, (b) collaboratively generating parts of a user session key and encrypting a combined user session key, (c) Authenticating with the authentication ticket at a distributed ticket granting server by collaboratively decrypting user request information using the combined user session key and comparing its content with the authentication ticket, (d) collaboratively generating an encrypted user-to-device ticket and parts of a user-to-device session key, and (e) accessing the device by the user using the encrypted user-to-device ticket and the user-to-device session key.

In an embodiment, a system is provided for accessing a device by a user, wherein the user is connectable to the device and to at least two authentication servers and two ticket granting servers, wherein each network comprises at least one authentication server and at least one ticket granting server is defined.

In an embodiment, the system is characterized by in that distributed authentication servers are operable to collaboratively generate parts of an authentication ticket and to collaboratively generate parts of a user session key and encrypting a combined user session key, that distributed ticket granting servers operable to authenticate the user with the authentication ticket by collaboratively decrypting user request information using the combined user session key and comparing its content with the authentication ticket and to collaboratively generate an encrypted user-to-device ticket and an encrypted user-to-device session key and that the device is operable to be accessed by the user using the encrypted user-to-device ticket and the user-to-device session key.

According to the invention it has been recognized that no single trusted entity needs to be available, i.e. a secure and cloud based authentication and access is enabled.

According to the invention it has been further recognized that an access of a device by a user is enabled which is secure against a compromise of a server, for example by malware, organized cyber attacks, malicious insiders or the like.

According to the invention it has been further recognized that changes on the user side and the device side are minimized so that existing running services can be easily modified respectively implemented.

According to a preferred embodiment all incoming traffic for the user for accessing the servers is routed through a proxy, preferably wherein the proxy combines outputs of the at least two servers for the user. The proxy enables an easy communication of the user with one or more of the servers in distributed network and enables very efficient combining by a single entity of the output of the servers to a single message sent back to the user.

According to a further preferred embodiment the user and/or the device are performing the Kerberos protocol. By using an authentication protocol which is Kerberos conform on the side of the client/user and/or the device a Kerberos capable device and Kerberos-capable client do not need to be modified. Therefore an easy implementation without the need to modify client or device is enabled even if the server side of the Kerberos protocol/Kerberos servers is moved into a cloud or distributed network.

According to a further preferred embodiment secure multi-party computing is used for encrypting and/or decrypting session keys and/or ticket content. Secure multi-party computation ensures that the encryption/decryption process will not leak any information about the input data, in particular user credentials and session keys.

According to a further preferred embodiment the servers generate their part of the tickets and/or their parts of the session keys locally. Local computation of the parts enables a fast and efficient way to provide parts of the tickets and/or parts of the session keys by the servers.

According to a further preferred embodiment an oblivious transfer protocol is used for transmitting secret keys in case a public key/secret key cryptography is used. This enables secrecy of the credentials of the user and the device as well as the session keys in the tickets, since oblivious transfer ensures that the input will remain secret and the output is an encrypted message so that the servers in the cloud do not know anything about the input, i.e. the credentials and the session keys. Therefore this further ensures secrecy of both long term secret keys and short term session keys. Further the security is enhanced, since by restricting knowledge and power on each cloud server it is harder for an adversary to capture credentials or issue unauthorized tickets.

According to a further preferred embodiment session keys are generated based on random number generation. This allows a fast and efficient way to provide session keys.

According to a further preferred embodiment a complete ticket is generated by concatenating all ticket parts. For example if a proxy is used the proxy can easily combine the outputs of the servers, i.e. the ticket parts without much involving of resources, for example CPU time or memory.

According to a further preferred embodiment the current user-to-device ticket is verified for a renewable user-to-device ticket and a new user-to-device ticket is generated according to step d) based on the current user-to-device ticket. For example, this enables in an easy and analogous way the use of the Kerberos protocol: A renewable ticket may be achieved by requiring the distributed ticket granting servers and two rounds of secure multi-party computing to decrypt and verify the current ticket and issue a new ticket with the same generation process or method of the current ticket. The verification ensures that the output only includes enough information for the verification process, i.e. validation of the ticket so that exploitable information as the current client and/or device session key will not be output by the secure multi-party computing.

According to a preferred embodiment of the system according to claim 10 different physical entities are provided wherein on the same physical entities one authentication server and one ticket granting server is provided. This enables an easy and efficient collaboration of the different physical entity for accessing the device by the user.

According to a further preferred embodiment of the system according to claim 10 a proxy is provided on one physical entity, wherein the proxy is operable to route all incoming traffic for the user for accessing the device, preferably wherein the proxy is operable to combine outputs of the at least two servers for the user. The proxy enables an easy communication of the user with one or more of the servers in distributed network and enables an efficient combining of the output of the servers to a single message sent back to the user.

FIG. 1 shows a system according to a first embodiment of the present invention.

In FIG. 1 a scenario is shown, in which a user U wants to access an object D. For accessing the object D the user U needs a ticket T1. To obtain a ticket T1 the user U issues an access request AR to the network N in a first step 1 comprising different separate cloud networks $cloud_1$, $cloud_2$, etc.. To provide user accounts, device keys or object keys and access policies for the object D a service provider SP is connected to the network N. However, the service provider SP is not always online, i.e. is not always connected to the network N. Therefore, the network N has to provide the ticket T1 back to the user U if the service provider SP is not connected in a second step 2. The user U in turn uses the ticket T1 in a third step 3 to access the object D.

Figure 2:
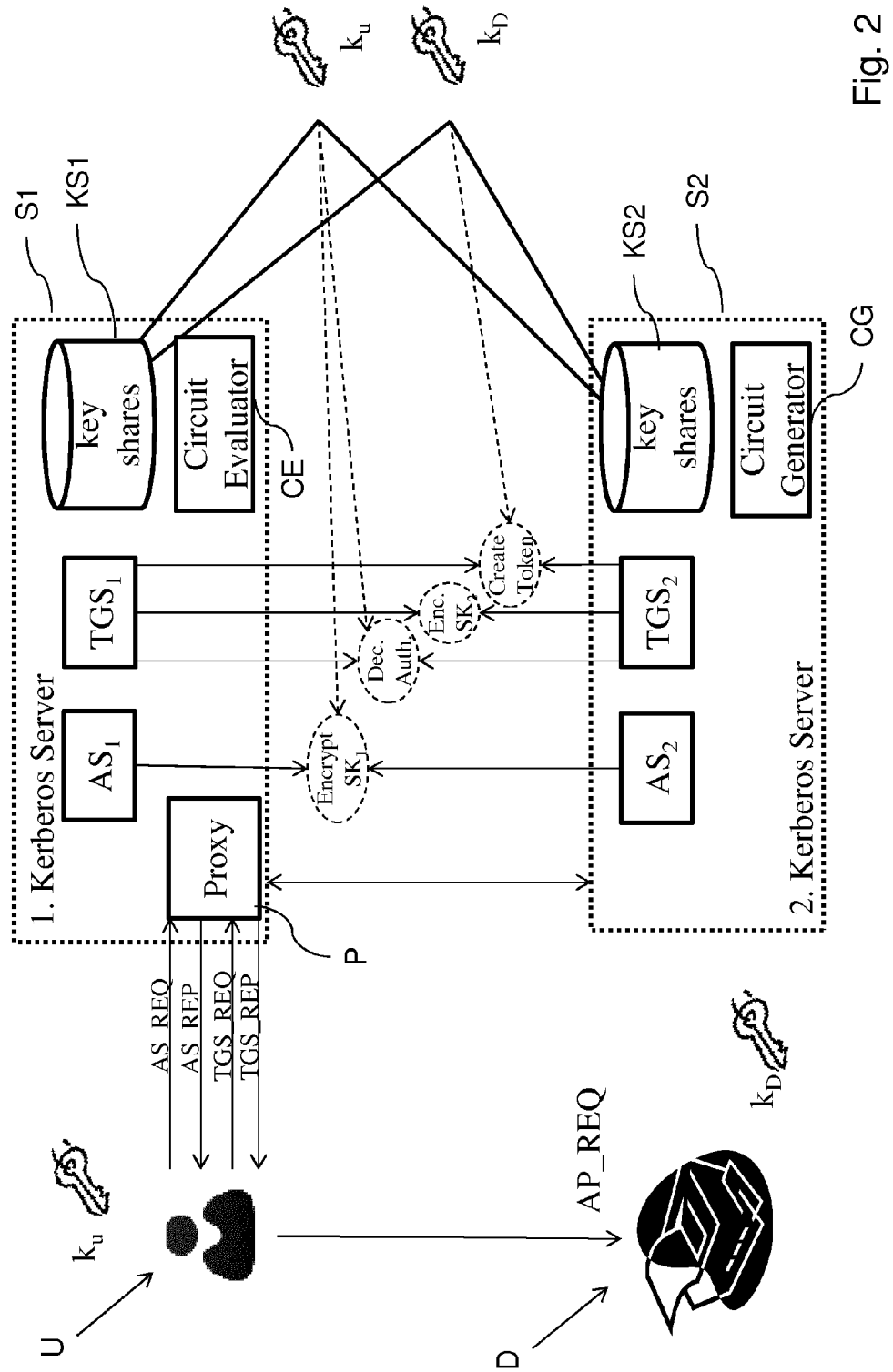
FIG. 2 shows a method according to a second embodiment of the present invention.

FIG. 2 shows a method according to a second embodiment of the present invention.

In FIG. 2 a user U wants to access a device D. Further the user U is connected to two servers S1, S2 located in the cloud and which offer authentication and authorization services for the user U to access a device D. In the following it is assumed that at least one of the servers S1, S2 operates faithfully.

The first server S1 comprises a proxy P for combining the output of the servers S1, S2 into a single message sent back to the user U, an authentication server $AS_1$, a ticket granting server $TGS_1$, a key share data base $KS_1$ and a circuit evaluator CE. The second server S2 comprises a second authentication server $AS_2$, a second ticket granting server $TGS_2$, a key share data base $KS_2$ and a circuit generator CG. Both servers S1, S2 are connected to each other. Further, the user U has a user credential/secret key $k_u$ and the device D has a device credential/secret key $k_D$. Each server S1, S2 only has key shares KS1, KS2 of the user credential $k_u$ and of the device credential $k_D$, i.e. the user and device keys are not present at any single location in the cloud nor any server S1, S2 is able to issue an unauthorized ticket without agreement of both servers.

When a user U wants to access the device D, the user has to send an authentication server request AS_REQ including his user information via the proxy P to one of the servers S1, S2. Without loss of generality in FIG. 2 this is server S1. The proxy P then sends the corresponding authentication request AS_REQ also to the second server S2. The first authentication server $AS_1$ and the second authentication server $AS_2$ then locally generate parts of a ticket granting ticket TGT1, TGT2 respectively and collaboratively generate an encrypted client/TGS session key $SK_1$. The parts of the ticket granting ticket TGT1, TGT2 each include part of the client/TGS session key $SK_1$, and are encrypted with the corresponding TGS1, TGS2 credentials. For encrypting the client's session key $SK_1$ secure multi-party computation is used, so that parts of the user credential $k_u$ and parts of the client's session key $SK_1$ will not be revealed to any party else.

A proxy P then sends back a concatenation of the encrypted client/TGS session key $SK_1$ and the parts of the ticket granting ticket TGT1, TGT2 to the user U as AS-REP. After receiving the encrypted client/TGS session key $SK_1$ and the ticket granting ticket TGT1, TGT2 the user U extracts the session key $SK_1$ formats a user-device request message using the session key $SK_1$ and issues a TGS_REQ request for user server authorization. The proxy P transfers the corresponding request including the ticket granting ticket TGT and an encrypted user ID and device ID information to the ticket granting severs $TGS_1$, $TGS_2$. The ticket granting servers $TGS_1$, $TGS_2$ then locally decrypt the parts of the corresponding ticket granting ticket TGT1, TGT2 and obtain their parts of the client/TGS session key $SK_1$. Then via a secure multi-party computing, the ticket granting servers $TGS_1$, $TGS_2$ decrypt the user request message with the combined client/TGS session key $SK_1$ and verify the validation of the user-device request message by comparing the decrypted user request information with the content in the ticket granting ticket TGT in particular under the current context, e.g. time.

If the decrypted content satisfy a predetermined authorization condition then the ticket granting servers $TGS_1$, $TGS_2$ collaboratively generate a client-to-device ticket and an encrypted client-device session key $SK_2$ both through secure multi-party computing. The client-to-device ticket is encrypted by the device secret key $k_D$ and contains the client-device session key $SK_2$ as well as authorization information about the user U. It is used by the device D for access control decisions and for communication with user U. The client-device session key $SK_2$ is also encrypted by the client/TGS session key $SK_1$ and is used by user U to communicate with device D.

After creating collaboratively the client-to-device ticket and the encrypted client-device session key the proxy P transmits them in a TGS-REP reply back to the user U which in turn uses then the client-to-device ticket and the client-device session key for accessing the device D in an AP_REQ.

In summary in FIG. 2 the roles of the authentication server $AS_1$, $AS_2$ and the ticket granting servers $TGS_1$, $TGS_2$ are split in a distributed manner among the two servers which can be generalized to n servers. Among the servers S1, S2, . . . , $S_n$ the client authentication keys and the device secret keys are secret-shared. The secret keys are not available at any of the n servers and can only be obtained if enough servers S1, S2, . . . , $S_n$ would maliciously collude. The client keys and the device keys are not present at any single location in the clouds in which the servers S1, S2, . . . , $S_n$ are located nor any server is able to issue an authorized ticket. The device keys and the client keys are always separated by using a secure multi-party computation.

Figure 3:
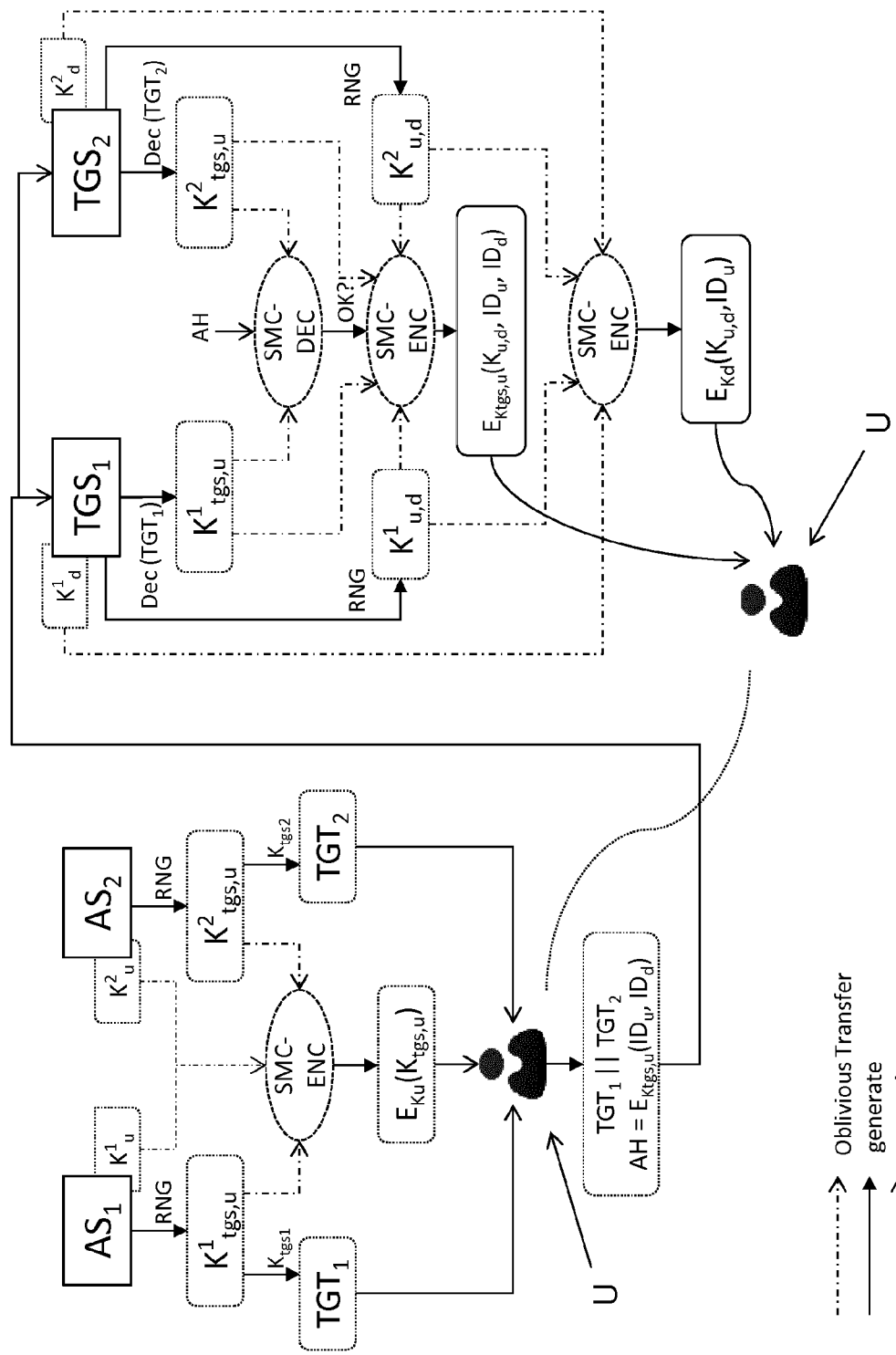
FIG. 3 shows a method according to a third embodiment of the present invention.

FIG. 3 shows a method according to a third embodiment of the present invention.

In FIG. 3 the method according to FIG. 2 is shown in more detail. Both authentication servers $AS_1$, $AS_2$ use random number generation RNG to create a share of a session key between the ticket granting server, TGS and the user U. These are named with reference signs $K^1_{tgs,u}$ and $K^2_{tgs,u}$. Further these session keys $K^1_{tgs,u}$ and $K^2_{tgs,u}$ are encrypted by encryption keys $K_{tgs1}$, $K_{tgs2}$ respectively resulting in corresponding parts of a ticket granting ticket TGT, i.e. TGT1 by authentication server $AS_1$ and TGT2 of authentication server $AS_2$. The separate ticket granting ticket TGT1 and TGT2 are transmitted to the user U.

Further split credentials of the user $K^1_U$ and $K^2_U$ are transmitted via oblivious transfer as well as the corresponding session keys $K^1_{tgs,u}$ and $K^2_{tgs,u}$ between the authentication servers $AS_1$ and $AS_2$ for secure multi-party encryption process. The result of the process is an encrypted session key between the ticket granting server TGS and the user U with the encryption key of the user, denoted with $E_{Ku}(K_{tgs,u})$. The encrypted user/TGS session key $E_{Ku}(K_{tgs,u})$ is also transmitted to the user U. The user U or an upstream proxy P concatenates the parts of the ticket granting ticket TGT1 and TGT2 and further a user ID $ID_u$, a device ID $ID_d$ and if applicable additional information are encrypted with the combined parts of the session key between the user and the ticket granting server TGS in an authentication header AH, wherein $AH = E_{Ktgs,u}(ID_u, ID_d)$. The user U then transmits the concatenated parts of the ticket granting tickets TGT1 || TGT2 and the authentication header AH to the ticket granting servers $TGS_1$ and $TGS_2$.

The ticket granting servers $TGS_1$ and $TGS_2$ then decode the corresponding parts of the ticket granting tickets TGT1 and TGT2 to obtain their corresponding shares of the session key $K_{tgs,u}$ between the ticket granting server TGS and the user U, denoted with the reference signs $K^1_{tgs,u}$ and $K^2_{tgs,u}$. These decrypted session key shares $K^1_{tgs,u}$ and $K^2_{tgs,n}$ are used to decode the authentication header AH to obtain the encrypted ID information and if applicable additional information by secure multi-party computing. The decrypted user ID and if applicable additional information is compared with the content of the decrypted parts of the ticket granting ticket DEC (TGT1) and DEC (TGT2)

If the decrypted contents satisfy a predetermined authorization condition then the ticket granting servers $TGS_1$ and $TGS_2$ use a random number generation RNG respectively to create parts of a session key between the user U and the device D, denoted with $K^1_{u,d}$ and $K^2_{u,d}$. Using parts of the session key between the user and the device $K^1_{u,d}$ and $K^2_{u,d}$ and the decrypted parts of the session key between the user U and the ticket granting servers $TGS_1$ and $TGS_2$, i.e. $K^1_{tgs,u}$ and $K^2_{tgs,u}$ they are encrypted via a secure multi-party computing SMC-ENC to obtain an encrypted session key between the user U and the device D $K_{u,d}$ and the corresponding user ID $ID_u$ and device ID $ID_d$ encrypted with the session key between the ticket granting server TGS and the user, i.e. $K_{tgs,u}$.

Further, the ticket granting servers $TGS_1$ and $TGS_2$ use split parts of the credential of the device D, denoted with $K^1_d$ and $K^2_d$ respectively, to encrypt the combined parts of the session key between the user U and the device $K^1_{u,d}$ and $K^2_{u,d}$ and user ID information $ID_u$. Therefore the combined session key between the user U and the device D $K_{u,d}$ and user ID $ID_u$ is encrypted with the device key Ka and transmitted to the user U. The user U then may use the encrypted session key $E_{Kd}(K_{u,d}, ID_u)$ and the encrypted ticket granting ticket $E_{Ktgs,u}(K_{u,d} ID_u, ID_d)$ to access the device D.

In summary FIG. 3 shows two rounds: In the so-called client authentication round the distributed authentication servers $AS_1, AS_2$ collaboratively generate the ticket granting ticket TGT and the encrypted client/TGS session key as a reply to a corresponding request of the user U. Secure multi-party computing SMC is used to encrypt the client's session key. In case of two authentication servers $AS_1, AS_2$ the secure multi-party computing protocol may be based on garbled circuits. All authentication servers compute their part of the ticket granting ticket TGT locally without using of secure multi-party computing SMC. The ticket granting ticket may be then the concatenation of all servers parts of the ticket granting ticket TGT. A proxy P may be responsible for combining the output of the authentication servers $AS_1$, $AS_2$ to a single message which is sent back to the user U.

In the second round the so-called client server authentication round the distributed ticket granting servers $TGS_1$ and $TGS_2$ verify the authentication header provided by the client by jointly decrypting the authentication header and comparing it with the user information in the ticket granting ticket TGT. This is denoted in FIG. 3 with AH, meaning authentication header. Upon agreement of all parties the ticket granting servers $TGS_1, TGS_2$ generate the client-to-device ticket by using secure multi-party computing SMC between the ticket granting servers $TGS_1$ and $TGS_2$ and the encrypted client device session key through two more rounds of secure multi-party computing SMC. Preferably in case of only two ticket granting servers $TGS_1$ and $TGS_2$ garbled circuits may be used. The agreement of all parties in authenticating the user is reached by modifying the garbled circuit to produce an output that is authenticated by the server that generates the circuit. Circuit evaluator CE and circuit generator CG are hosted on separate servers S1, S2, shown in FIG. 2. A proxy P may be responsible for combining the output of the ticket granting servers $TGS_1, TGS_2$ to a single message sent back to the user U. Issuing of the ticket and the communication between the client/user and the device will be the same as in the standard Kerberos protocol. During the rounds all session keys will be created by the distributed authentication servers $AS_1, AS_2$ and ticket granting servers $TGS_1, TGS_2$ by using random number generation RNG. The encryption and/or decryption functions receive shares of the secret keys as private inputs using an oblivious transfer OT protocol. The input will remain secret by the oblivious transfer OT and the output is an encrypted message so the cloud servers $AS_1, AS_2, TGS_1, TGS_2$ know nothing about the device D or user U credentials.

Further optional flags described in the Kerberos protocol such as a renewable ticket can also be provided. The distributed ticket granting servers $TGS_1$ and $TGS_2$ and two rounds of secure multi-party computing SMC decrypt and verify the current ticket and issue a new one with the same process for providing the current ticket. A verification circuit CE may verify that the output only includes enough information for the verification process, i.e. for the validation of the issued ticket.

In summary, an embodiment of the present invention enables creation of a distributed ticket issuing protocol that makes use of multiple cloud providers to offer efficient access control for preferably Kerberos capable devices. The present invention guarantees that m malicious servers, for example a single malicious server cannot issue tickets that would not be authorized. The present invention provides distribution of the role of a Kerberos analogue server securely on two or more servers using multiple instances of secure multi-party computation. The present invention enables a modification of a token granting ticket TGT to support efficient authentication by multiple clouds reducing the necessary number of rounds. The present invention provides resilience of Denial Of Service attacks and better availability of a service by using an m out of n solution rather in one out of two.

An embodiment of the present invention further enables secret-share of credentials between multiple cloud servers and the credentials are never revealed to any single party. Secure multi-party computation is used for creating encrypted parts of messages and tickets and for the authentication of the user at the device and at the servers. The present invention has inter alia the advantage that changes or client/user device side is kept to a minimum in particular with regard to the traditional Kerberos protocol: Existing running services can be easily shifted to a multiple cloud scenario. Even further no single trusted entity needs to be available authorization and access of the user and device are secure against compromise of a server for example by malware, organized cyber attacks, malicious insiders or the like.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for accessing a device by a user, the method comprising:
 a) collaboratively generating an authentication ticket on at least two servers in different networks, wherein each server of the at least two servers generates a part of the authentication ticket, the authentication ticket comprising at least two parts;

b) collaboratively generating a user session key, wherein the user session key comprises at least two parts corresponding to each server of the at least two servers;
c) authenticating the user with the authentication ticket by collaboratively decrypting user request information using the user session key and comparing content of the decrypted user request information with the authentication ticket;
d) collaboratively generating an encrypted user-to-device ticket and an encrpted user-to-device session key; and
e) sending the encrypted user-to-device ticket and the encrypted user-to-device session key to the user so that the device is accessible by the user using the encrypted user-to-device ticket and the user-to-device session key.

2. The method according to claim 1, wherein all traffic from the at least two servers to the user for accessing the device is routed through a proxy.

3. The method according to claim 2, wherein the proxy combines outputs of the at least two servers for the user.

4. The method according to claim 1, wherein at least one of the user or the device performs a Kerberos protocol.

5. The method according to claim 1, wherein secure multi-party computing is used for at least one of encrypting or decrypting at least one of keys or tickets.

6. The method according to claim 1, wherein the collaboratively generating the authentication ticket on the at least two servers is performed locally.

7. The method according to claim 1, wherein an oblivious transfer protocol is used for transmitting secret encryption keys when a public key/secret key cryptography is used.

8. The method according to claim 1, wherein at least one of the parts of the user session key and the user-to-device sessions key is generated using random number generation.

9. The method according to claim 1, further comprising generating a complete ticket by concatenating the parts of the authentication ticket.

10. The method according to claim 1, further comprising, for a renewable user-to-device ticket:
verifying a current user-to-device ticket; and
generating a new user-to-device ticket according to step d) based on the current user-to-device ticket.

11. The method according to claim 1, wherein the collaboratively generating parts of a user session key on the at least two servers is performed locally.

12. A system for accessing a device by a user, the system comprising:
at least two distributed authentication servers and at least two distributed ticket granting servers in different networks, the distributed authentication servers being operable to collaboratively generate a combined authentication ticket and to collaboratively generate a combined user session key, wherein each distributed authentication server generates a part of the combined authentication ticket and a part of the combined user session key, the authentication ticket and the user session key comprising multiple parts,
wherein the distributed ticket granting servers are operable to authenticate the user with the authentication ticket by collaboratively decrypting user request information using the combined user session key and comparing content of the decrypted user request information with the authentication ticket and to collaboratively generate an encrypted user-to-device ticket and an encrypted user-to-device session key,
wherein the device is accessible by the user using the encrypted user-to-device ticket and the encrypted user-to-device session key.

13. The system according to claim 12, wherein at least two different physical entities are provided, and
wherein one of the distributed authentication servers and one of the distributed ticket granting servers are provided on the same physical entity.

14. The system according to claim 13, wherein a proxy is provided on one of the at least two different physical entities, wherein the proxy is operable to route all traffic from the at least two different physical entities to the user for accessing the device.

15. The system according to claim 14, wherein the proxy is operable to combine outputs of the at least two different physical entities for the user.

* * * * *